United States Patent
Wouhaybi et al.

(10) Patent No.: US 9,916,866 B2
(45) Date of Patent: Mar. 13, 2018

(54) EMOTIONAL TIMED MEDIA PLAYBACK (71) Applicant: Intel Corporation, Santa Clara, CA (US)

(72) Inventors: Rita H Wouhaybi, Portland, OR (US); Igor Tatourian, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 16 days.

(21) Appl. No.: 14/978,870

(22) Filed: Dec. 22, 2015

(65) Prior Publication Data
US 2017/0178692 A1 Jun. 22, 2017

(51) Int. Cl.
*H04N 9/80* (2006.01)
*G11B 27/34* (2006.01)
*G11B 27/11* (2006.01)
*H04N 21/442* (2011.01)
*H04N 21/854* (2011.01)
*H04N 21/45* (2011.01)
*G11B 27/02* (2006.01)
*H04N 21/845* (2011.01)
(Continued)

(52) U.S. Cl.
CPC .............. *G11B 27/34* (2013.01); *G11B 27/02* (2013.01); *G11B 27/11* (2013.01); *H04N 21/44218* (2013.01); *H04N 21/4532* (2013.01); *H04N 21/4667* (2013.01); *H04N 21/8455* (2013.01); *H04N 21/8547* (2013.01); *H04N 21/85406* (2013.01)

(58) Field of Classification Search
CPC ......... H04N 21/44218; H04N 21/4532; H04N 21/4667; H04N 21/8455; H04N 21/85406; H04N 21/8547; G11B 27/34; G11B 27/02; G11B 27/11
USPC ......................................... 386/239, 241, 248
See application file for complete search history.

(56) References Cited

U.S. PATENT DOCUMENTS 6,934,461 B1* 8/2005 Strub .................. G11B 27/031
348/E7.088
2008/0062291 A1* 3/2008 Sako .................. G02B 27/0093
348/294
(Continued)

FOREIGN PATENT DOCUMENTS

CN 103064958 A 4/2013

OTHER PUBLICATIONS

"International Application Serial No. PCT/US2016/062783, International Search Report dated Feb. 23, 2017", 3 pgs.
(Continued)

*Primary Examiner* — Mishawn Hunter
(74) *Attorney, Agent, or Firm* — Schwegman Lundberg & Woessner, P.A.

(57) ABSTRACT

Embodiments of a system and method for emotional tagging are generally described herein. A method may include receiving, at a device, biometric data and a timestamp, analyzing the biometric data to determine an emotional reaction occurred, tagging a portion of content with an emotional content tag based on the emotional reaction, wherein the portion of content was playing during a time corresponding to the timestamp, and sending the portion of content and the emotional content tag to a server. A method may include aggregating content tagged as emotional content, generating an emotional content video segment, and providing the emotional content video segment.

25 Claims, 6 Drawing Sheets

(51) Int. Cl.
　　　*H04N 21/466* 　　　(2011.01)
　　　*H04N 21/8547* 　　(2011.01)

(56) References Cited

U.S. PATENT DOCUMENTS

| | | | |
|---|---|---|---|
| 2008/0101660 A1 | 5/2008 | Seo | |
| 2012/0143693 A1 | 6/2012 | Chung et al. | |
| 2012/0324491 A1* | 12/2012 | Bathiche | H04H 60/33 725/10 |
| 2013/0095864 A1* | 4/2013 | Marovets | H04W 4/14 455/466 |
| 2014/0137162 A1* | 5/2014 | McNamee | H04N 21/2187 725/63 |
| 2014/0347265 A1* | 11/2014 | Aimone | G09G 3/003 345/156 |
| 2014/0368688 A1 | 12/2014 | John Archibald et al. | |
| 2015/0178915 A1* | 6/2015 | Chatterjee | G06K 9/20 382/128 |

OTHER PUBLICATIONS

"International Application Serial No. PCT/US2016/062783, Written Opinion dated Feb. 23, 2017", 6 pgs.

\* cited by examiner

EMOTIONAL TIMED MEDIA PLAYBACK

BACKGROUND

The way people watch media has changed tremendously from the days when personal schedules were set around TV shows to present day where media streaming over the Internet is predominant, often in small media segments, as made popular by online services. People often login into websites with video media services to watch small video segments (often less than 5 minutes), to do what some media experts call "Media Snacking." This type of consumption was made popular due to the busy lives of people and their need for small breaks that provide mental and emotional relief.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Viewing short video segments has become increasing common. These videos may be authentic new creations by users or small chunks extracted from popular movies, TV shows, concerts, sports games, etc. These small chunks may be nuggets that stand out due to some intense emotions that they evoke, such as laughter and happiness, sadness, compassion, motivational talks, victory or the like. The extraction of these nuggets is currently done manually and may result in tens or hundreds of copies of the same event with slightly different time windows. For example, a basketball score that gave a team a very important win may be played over and over again for years to come, and where to start that clip and for how long to record may differ in the various copies. The score may have happened as a result of a ball steal and one version of the clip may include those 20 seconds from the steal to the score. Yet, another version produced by a different fan may include a 2-minute playback where prior to the steal their star player may have been illegally tackled and injured which led to emotional charge both of the players and fans and finally to the decisive score. Yet another different clip may start from the score and run longer to show the celebration of the team and interviews with the leading players. The same chunking may apply to other videos, such as speeches, movies, and the like. For an end user, making the choice of which video to play-back may be random and uninformed and may include several attempts before the "correct" (at least to the user) video is found.

Using advances in wearables, context-aware systems, or HTML5 video playback (Timed Media Playback), a more adaptive automated system for video marking/chunking and personalized playback may be created.

In an example, a standard media file type, such as HTML5, as defined by the World Wide Web Consortium (W3C) may be used to play media. A component of HTML5 includes Timed Media, which defines media objects with audio, and video streams, captions and other synchronization information. These elements allow developers to specify external tracks for the media objects.

A technique may include using heart rate signatures of a user during video playback to identify a specified chunk of video for playback. The technique may be iterated and use crowd sourcing to anonymize personal data of emotions and to create time windows with a large appeal (e.g., normalizing and averaging). The data may be saved in a Timed Media stream corresponding to the chunk of video. When a second user requests to play the video (or to play video corresponding to an event), multiple possible video chunks may be generated on the fly for playback. The technique may include self-selecting an appropriate video chunk to play based on the second user, the user's context and schedule, or providing the second user with different options to make a selection.

Figure 1:
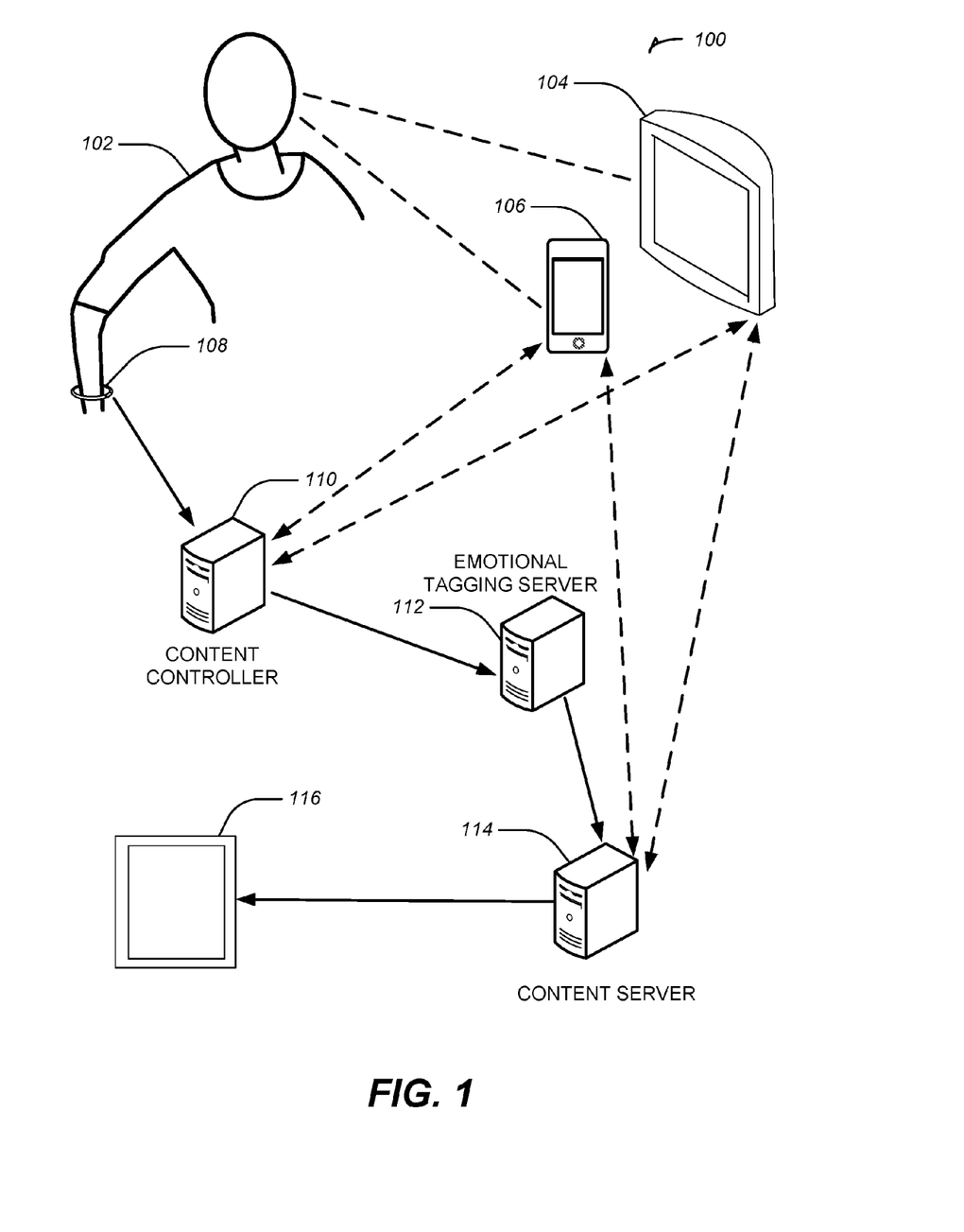
FIG. 1 illustrates a diagram showing an emotional tagging system in accordance with some embodiments.

FIG. 1 illustrates a diagram showing an emotional tagging system 100 in accordance with some embodiments. The emotional tagging system 100 includes a user 102 and one or more display devices, 104-106. The one or more display devices, 104-106 may include any device capable of displaying media. In another example, the user 102 may listen to audio on a device in the emotional tagging system 100. The user 102 wears a wearable device 108, including a sensor, such as a sensor for heart rate monitoring. As the user 102 watches media on the one or more display devices 104-106, the wearable device 108 may monitor attributes of the user 102. In an example, the wearable device 108 analyzes emotional reactions to media displayed on the one or more display devices, 104-106. In this example, the wearable device 108 may send the emotional reactions to a content controller 110. The emotional tagging system 100 includes the content controller 110, in wireless communication with the wearable device 108. The content controller 110 may include a computer, tablet, mobile phone, etc. The content controller 110 may be used to analyze and compare the received emotional reaction to a baseline, such as a general baseline or a user-specific baseline. When the content controller 110 determines that an emotional reaction has occurred, such as when the received emotional reaction fits an emotional reaction model or exceeds the baseline, the content controller 110 may tag content with an emotional content tag. The content controller 110 may be in communication with the one or more display devices, 104-106. The content controller 110 may tag the media playing on the one or more display devices, 104-106 when the wearable device 108 detected emotional reaction occurred. The content controller 110 may tag the media using a Timed Playback tag in an HTML5 media file. In an example, emotional analysis may include using a heart rate, facial expressions, audio interpretation (e.g., volume, words, changes, etc.), distraction level (e.g., eye contact), etc. may be used. In another example, emotional analysis may include using blood pressure or skin conductance, such as by measuring sweat, to distinguish among emotional response types, such as angry or nervous.

The emotional tagging system 100 includes an emotional tagging server 112 in communication with the content controller 110 and optionally in communication with the one or more display devices, 104-106. The emotional tagging server 112 may aggregate the emotional Timed Playback tagged media with other emotional tagged media. A plurality of media clips with emotional tags (or a plurality of emotional tags) may be created by the emotional tagging server 112. The emotional tagging server 112 may send the Timed Playback emotional tag, a media clip, or both to a content server 114 of the emotional tagging system 100. The content server 114 may request aggregated content markers from the emotional tagging server 112. In an example, the content server 114 may generate clippings, such as a set of segments of videos or start and end markers for a video. The generated clippings may include Timed Playback tags. The emotional tagging system 100 may receive a request, such as at the content server 114, for media. The request may include a desired emotional tag or for media relating to an event. The request may be made at device 116. The device 116 may receive, from the content server 114, media including an emotional content tag for a user, such as a second user or user 102, to view, select from and then view, or request refinement. The device 116 may include, in a request for content to the content server 114, a time limit or time range for the media.

In an example, one or more of the content controller 110, the emotional tagging server 112, and the content server 114 may be combined on a single server or device. The one or more display devices, 104-106 may be combined with one or more of the content controller 110, the emotional tagging server 112, and the content server 114. In another example, the one or more display devices, 104-106 may include the device 116.

In an example technique using the emotional tagging system 100, during a playback of an original segment of video, the user 102 may stream content from a server. The wearable device 108 captures the emotional status of user 102 for variations from a baseline that are specific to the user 102. The baseline may be learned by the wearable device 108 over a short period of time (e.g., during a training). The wearable device 108 may be a personal device, and the data learned may be specific to the user 102. The baseline may include the intensity of an emotion and variations of the reactions of the user 102. In another example, sensor data from the wearable device 108 may be augmented by other inputs such as a camera mounted on the one or more display devices, 104-106 facing the user 102 to analyze the facial expressions of the user 102. An output to a user from the content server 114 may be based on demographics of a user viewing the content. For example, metadata, previous user reactions, or user preferences, such as political views, actor preferences, types of television or movie preferences, previous viewings of the media, or the like, may be used as demographics.

Figure 2:
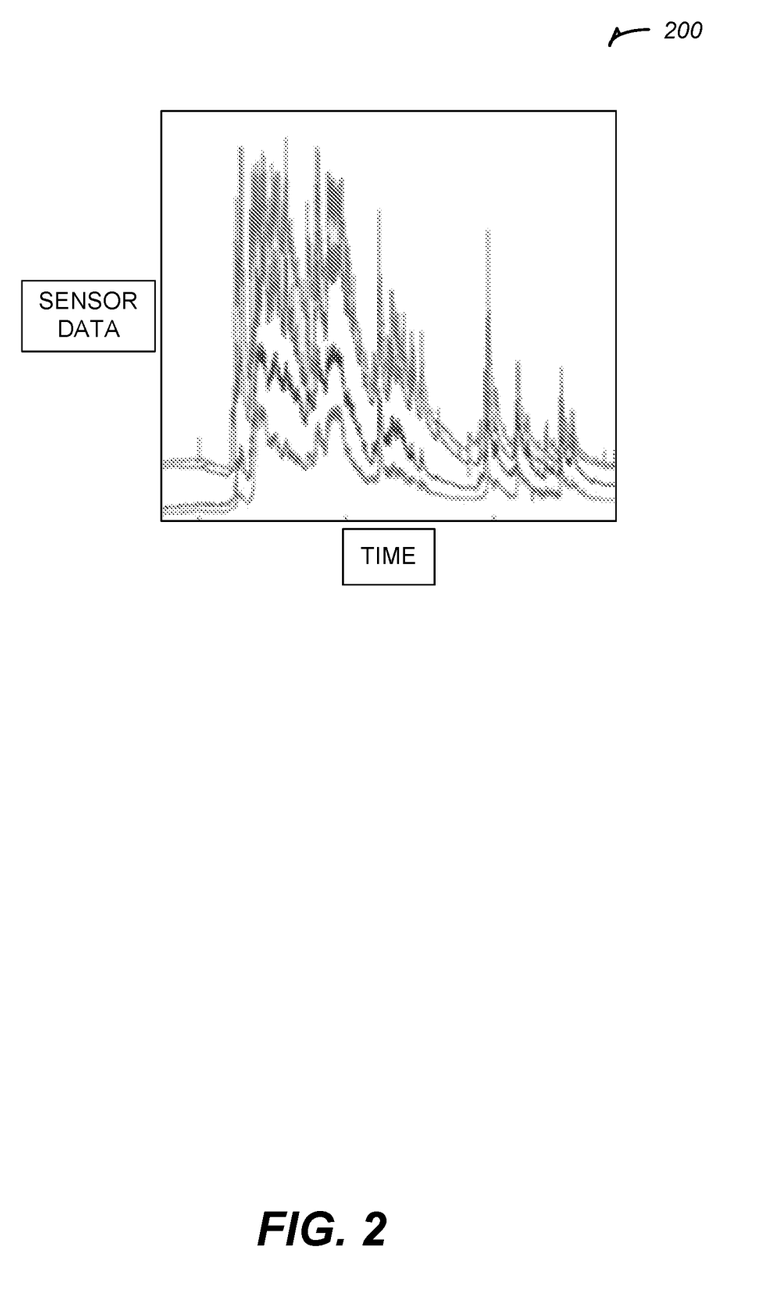
FIG. 2 illustrates a diagram showing sensor data over time in accordance with some embodiments.

FIG. 2 illustrates a diagram 200 showing sensor data over time in accordance with some embodiments. The diagram 200 shows a correlation among several streams of sensors showing excitement of a user over a period of time. The streams include peaks and valleys at corresponding times, indicating that the excitement shown is repeated in a measurable way. In an example, the streams may be normalized to a model and the normalized model may be used as a baseline for future measurements, such as to determine if the user is showing excitement. For example, a stream of measurements from a sensor may measure the user showing excitement, which may be determined from comparing the stream (and may normalize the stream) to the baseline. In an example, the sensor data may be extracted from a heart rate, facial recognition or facial expressions, a galvanic skin response, etc.

As seen in diagram 200, the measurements eventually decrease in intensity and taper out over time. When determining where to start and stop a segment of media corresponding to the excitement, the diagram 200 may be used. For example, the segment may start a few seconds before the first measurement peak and go until a few seconds after the measurements start to taper off.

In another example, diagram 200 may represent measurements from a first user. A diagram for a second user may include a different set of peaks and valleys, which may be used to create a different baseline. The baseline for the first user may be compared to the baseline for the second user to see if the same sort of emotional response is exhibited by the second user. This may be repeated for a plurality of users to determine a standard emotional response. In an example, the strongest emotional response may be used to determine the timing of the segment. In another example, multiple different versions of the segment may be created, and may be ranked based on how demographics for a viewing user compare to demographics of the baseline user. The demographics may include gender, location, past views, user submitted preferences (e.g., user preference to see highlights without context, user preference to see lead up and celebration after events, etc.), browser history, or the like.

In an example, diagram 200 may represent a positive emotional reaction. In another example, a negative emotional reaction may correspond to a different diagram used to create a negative baseline. For example, heart rate monitoring may be used to determine whether an emotional reaction is positive or negative. In this example, a user that is happy or excited may represent a positive emotional reaction and a user that is sad or angry may represent a negative emotional reaction. Other sensor monitoring, camera emotion detection, or user input may be used to further refine the positive or negative emotional reaction. In an example, such as the one shown in diagram 200, a positive emotional reaction may be illustrated by a stream with a subdued, long peak followed by a quick drop off. In another example, a negative emotional reaction may be illustrated by a stream with a sharply intense peak with a long tail.

Figure 3:
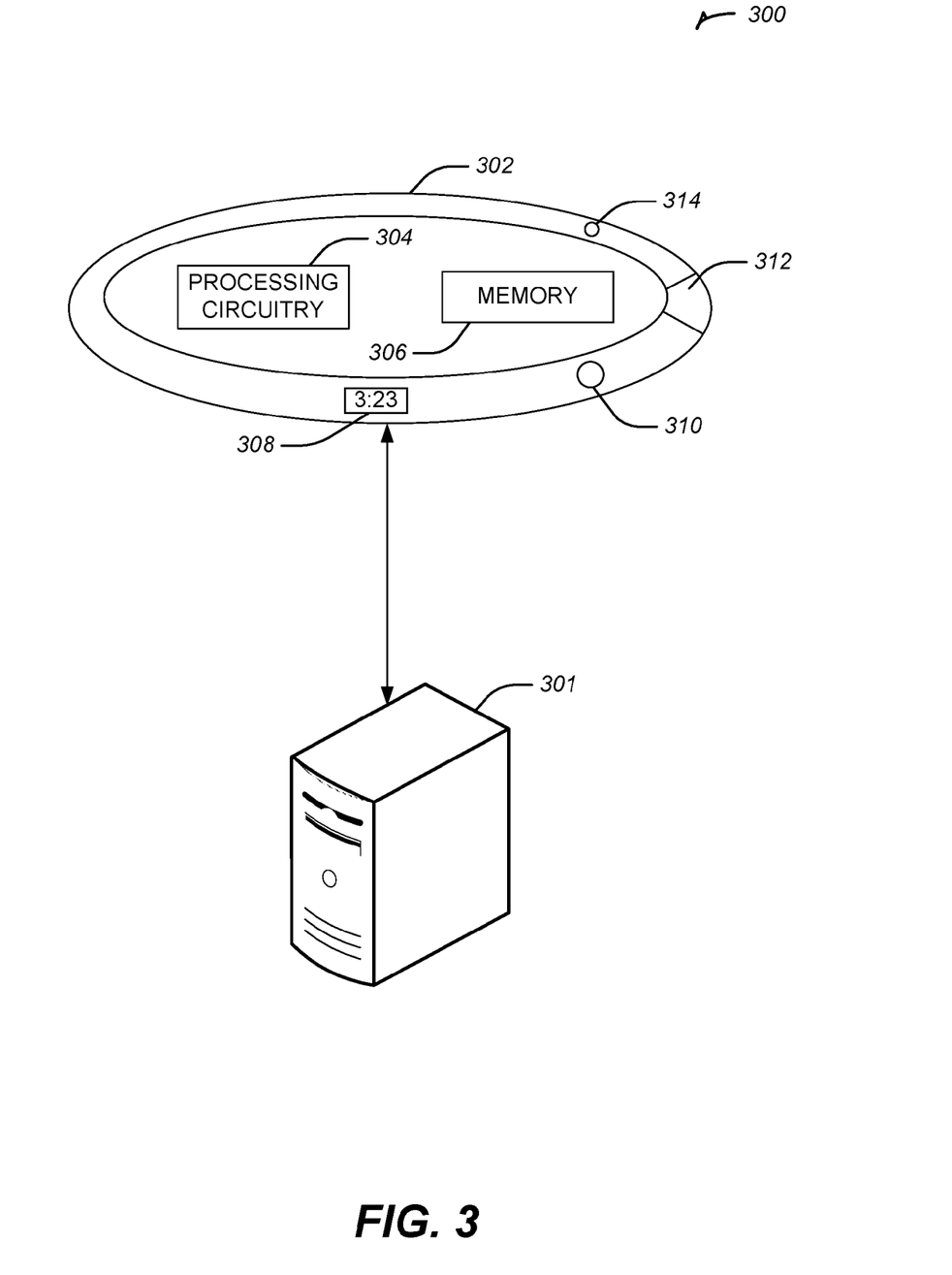
FIG. 3 illustrates a wearable device tagging system in accordance with some embodiments.

FIG. 3 illustrates a wearable device tagging system 300 in accordance with some embodiments. The wearable device tagging system 300 includes a wearable device 302 and a device 301. The device 301 may include a mobile device, such as a phone or tablet, a computer, or a server. The wearable device 302 may include processing circuitry 304, memory 306, a display 308, a sensor 310, a button 312, or a camera 314.

In an example, the sensor 310 may be used to measure heart rate, blood pressure, or skin conductance. The blood pressure, skin conductance, or heart rate measurements may be used to determine periods of time when a user wearing the wearable device 302 is feeling an emotion or intense emotion. The determination may be made by the processing circuitry 304 using a model or predetermined medical research results. For example, both sadness and happiness (e.g., a negative and a positive emotion) may increase the heart rate. The period of change and the response times may be different in the positive and negative emotions allowing the ability to identify polarity of the emotion (e.g., positive or negative) using a heart rate with high accuracy.

In another example, when the wearable device 308 detects an emotional event during playback of media, the wearable device 308 may forward those events or information about those events to the device 301, such as a device for watching the media or a device that is reachable by both a content provider and the wearable device 308. The device 301 may sync a received stream of emotional events from the wearable device 308 to media content that was playing during the emotional event. In an example, the syncing may be used to create an HTML5 media file with Timed Playback tagged data.

The device 301 may upload the data to an emotional tagging server. The server may aggregate the emotional data coming from multiple users. This aggregation may allow the emotional tagging server to provide a level of privacy for sensitive data, such as emotions of individuals, and it may offer the emotional tagging server the opportunity to smooth outliers in the data. The outliers may include emotional responses that occurred during playback of media, that were caused by factors other than the media, such as a phone call, activity in the room, or a myriad of other reasons people have emotional responses. In another example, outliers may result from a user having a particularly bad day with skewed emotions. The emotional tagging server may reject the outliers unless other aggregated content shows user experience of emotions at around the same playback time.

The wearable device 308 may send to the device 301, which may compile, other details and features about the user that may be useful in characterizing the user's emotional streams. The set of features may include demographics, a typical baseline, typical emotional variance, favorite artists, teams, political parties, ideologies, and the like. In an example, the data may be indicated explicitly or learned by behavior detection or recognition. The emotional tagging server may receive the data and may use machine learning to detect a series of patterns from multiple users to create a global emotional stream. The global emotional stream may include an emotional content tag that may be attached to the media. In another example, a unique identifier of the media may be used to create a unique hash. The hash may be used to communicate with a media server and indicate the existence of a Timed Playback stream with emotional data. When a user requests the media, a content server may request a stream. The content server may receive the emotional stream or pieces of it.

In an example, a user may be matched with a generic set of emotional markers used to chunk a stream on the fly and offer the user multiple versions with different playback times. If the user shares profile data with the content server, such as the data gathered and maintained locally by the wearable device 308, the user may receive a different stream that matches the user's personality more precisely based on other users with similar traits. The emotional state of the user may be uploaded to a server for further refinement of the data.

In another example, emotional markers may be used to remove or skip over scenes from a stream based on inappropriate content, according to a user preference. For example, a parent may automatically restricting content for a child without previewing the content, based on emotional reactions of other users to the content (e.g., other parents tagging the content as unsuitable for children under a specified age). In another example, an emotional disclaimer may be displayed or sounded before content plays. For example, a movie may be indicated to include scary or sad scenes, based on the reactions of users. Individual scenes may include an emotional disclaimer. For example, a user watching a movie may receive an emotional disclaimer that a next scene will make the user sad, happy, angry, joyful, scared, etc. The emotional disclaimer may include a displayed alert, an audible alert, or a haptic alert. The emotional disclaimer may be made by a device displaying the content, a mobile device, or the wearable device 308. For example, the wearable device 308 may light up or vibrate in response to receiving an indication that the next scene has emotional content. This may allow the user to process the warning without interrupting a current scene. In another example, the emotional disclaimer may allow a user or parent to skip the next scene, mute it, mute and display text, create a summary of images to summarize the next scene, such as when the scene is important to a plot, or the like. In yet another example, if a user is wearing personalized glasses or goggles to view the content, the next scene may be filtered out for the user or displayed for the user while acting differently for other users.

Figure 4:
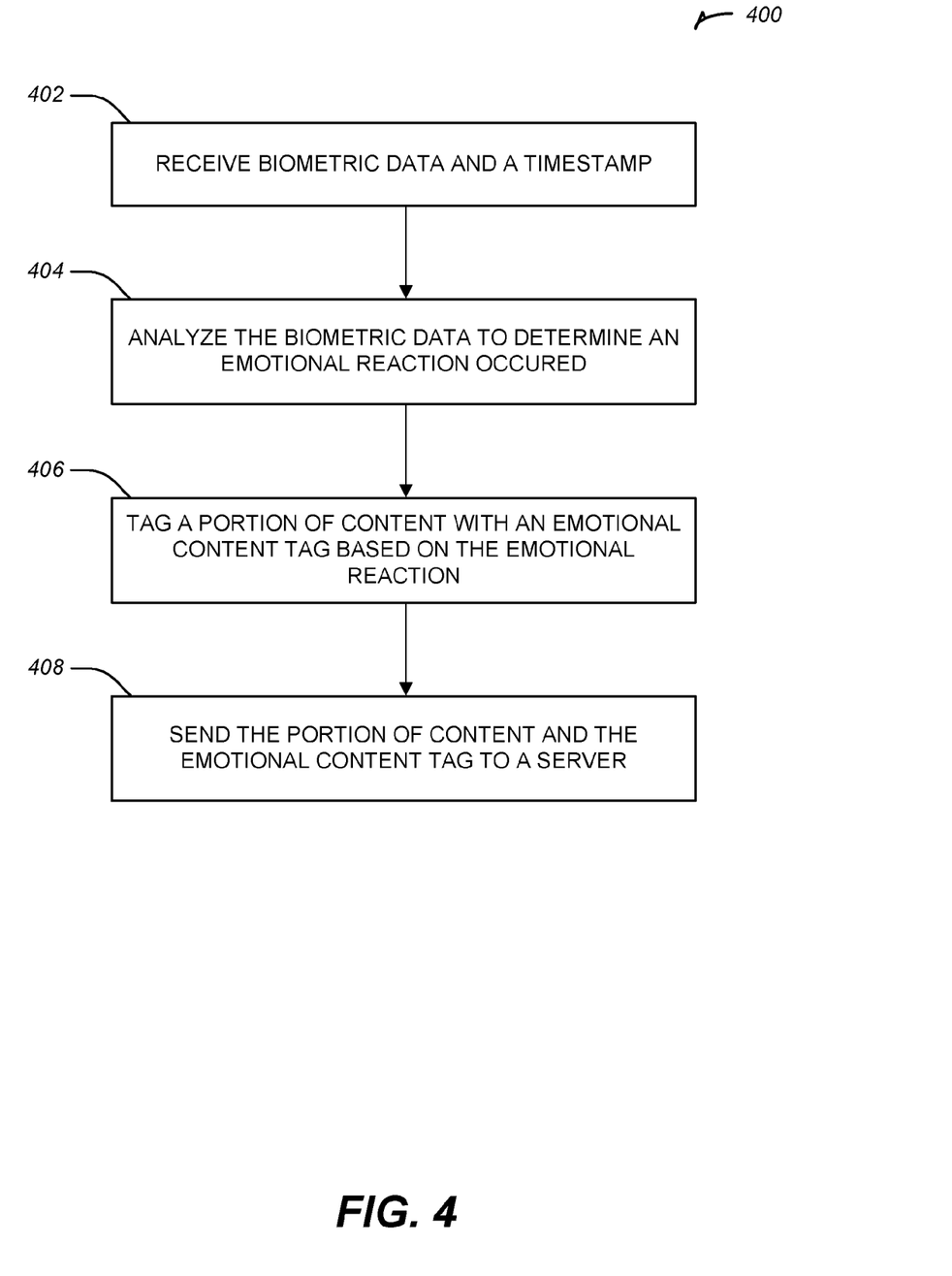
FIG. 4 illustrates a flowchart showing a technique for emotional tagging in accordance with some embodiments.

FIG. 4 illustrates a flowchart showing a technique 400 for emotional tagging in accordance with some embodiments.

The technique 400 includes an operation 402 to receive biometric data and a timestamp. The biometric data and the timestamp may be received at a device, such as a wearable device. In an example, the biometric data and the timestamp may be generated by a wearable device. The biometric data may include heart rate data, blood pressure data, skin conductance data, camera data, or the like.

The technique 400 includes an operation 404 to analyze the biometric data to determine an emotional reaction occurred. To analyze the biometric data may include analyzing heart rate data to determine whether the heart rate data matches a positive or a negative profile, such as a baseline of the user. The emotional content tag may include a positive emotional content tag when the heart rate data matches the positive profile and may include a negative emotional content tag when the heart rate data matches the negative profile.

The technique 400 includes an operation 406 to tag a portion of content with an emotional content tag based on the emotional reaction. In an example, the portion of content may be a portion of content that was playing during a time corresponding to the timestamp. In another example, tagging the portion of content may include adding a tag, such as a Timed Media tag to an HTML5 media file. The HTML5 media file may include the portion of content. In yet another example, the emotional content tag may be based on predefined demographics of a user of the device.

The technique 400 includes an operation 408 to send the portion of content and the emotional content tag to a server. The technique 400 may further include creating the portion of content from a content file. The portion of content may be created using the timestamp and a detected scene beginning. In another example, two timestamps may be used, a first timestamp corresponding to a beginning of the emotional reaction and a second timestamp corresponding to an end of the emotional reaction. The content portion may be created using the two timestamps, such as by starting and ending the content portion at the first and second timestamps or a few seconds before or after.

Figure 5:
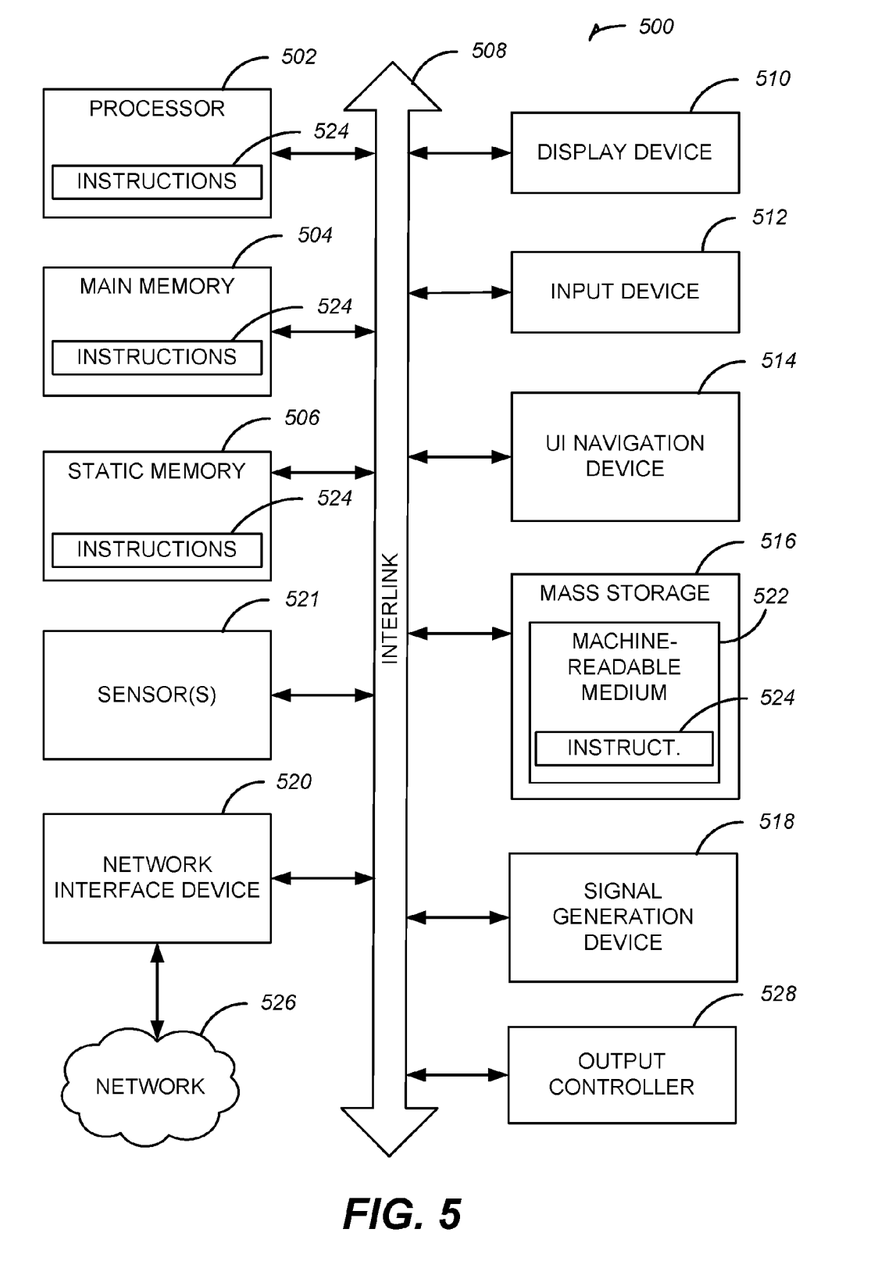
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
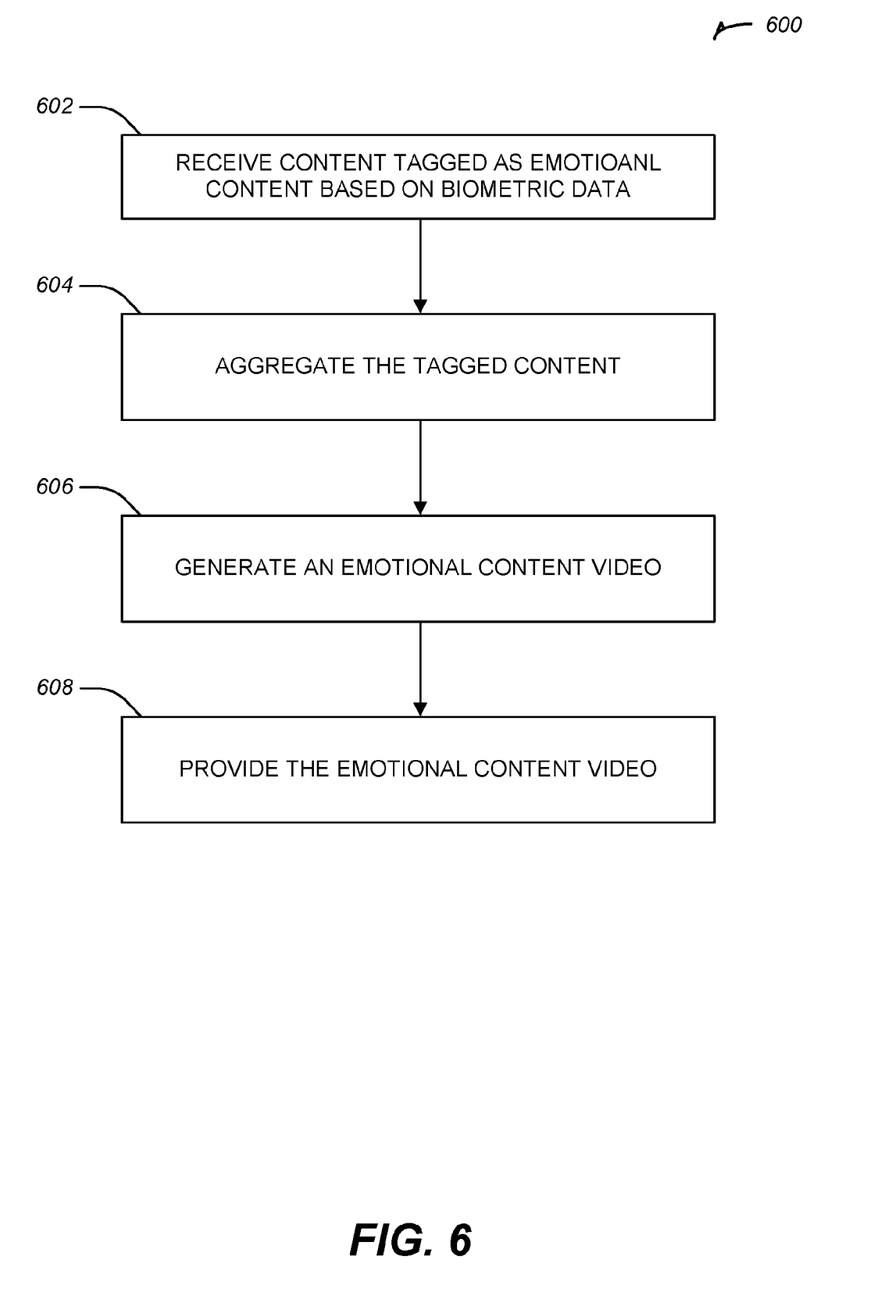
FIG. 6 illustrates a flowchart showing a technique for aggregating emotional content in accordance with some embodiments.

FIG. 6 illustrates a flowchart showing a technique 600 for aggregating emotional content in accordance with some embodiments. The technique 600 includes an operation 602 to receive content tagged as emotional content based on biometric data. For example, the biometric data may be from a wearable connected. The biometric data may illustrate an emotional reaction to video content, such as the content tagged as emotional content. The biometric data may include heart rate data, blood pressure data, skin conductance data, or the like. The technique 600 includes an operation 604 to aggregate the tagged content. In an example, aggregating the tagged content may include aggregating the tagged content with other received content based on metadata from the tagged content.

The technique 600 includes an operation 606 to generate an emotional content video. The emotional content video may be generated in response to receiving a request for emotional content. Receiving the request may include receiving a request for positive or negative emotional content. The request may include a specific emotional reaction, such as one desired by a user (e.g., "I want to feel happy"). The technique 600 includes an operation 608 to provide the emotional content video, for example, in response to receiving the request. The emotional content video provided may include an HTML5 video file. For example, a user may be in a sad mood and want to see a tear-jerker. The user may request a list of clips or recommendations based on crowdsourced metadata or based on the user's past preferences. In another example, the user may be want motivation. The technique 600 may return a particular video that evokes a strongest crowdsourced response, which may be shown to the user.

VARIOUS NOTES & EXAMPLES

Each of these non-limiting examples may stand on its own, or may be combined in various permutations or combinations with one or more of the other examples.

Example 1 is a wearable device comprising: processing circuitry to: receive biometric data and a timestamp; analyze the biometric data to determine an emotional reaction occurred; tag a portion of content with an emotional content tag based on the emotional reaction, wherein the portion of content was playing during a time corresponding to the timestamp; and send the portion of content and the emotional content tag to a server.

In Example 2, the subject matter of Example 1 optionally includes, wherein the biometric data includes heart rate data.

In Example 3, the subject matter of Example 2 optionally includes, wherein to analyze the biometric data, the processing circuitry is to analyze the heart rate data to determine whether the heart rate data matches a positive or a negative profile.

In Example 4, the subject matter of Example 3 optionally includes, wherein the emotional content tag includes a positive emotional content tag when the heart rate data matches the positive profile and includes a negative emotional content tag when the heart rate data matches the negative profile.

In Example 5, the subject matter of any one or more of Examples 1-4 optionally include, wherein to tag the portion of content the processing circuitry is to add a tag to an HTML5 media file.

In Example 6, the subject matter of any one or more of Examples 1-5 optionally include, wherein the processing circuitry is to create the portion of content from a content file, the portion of content created based on the timestamp and a detected scene beginning.

In Example 7, the subject matter of any one or more of Examples 1-6 optionally include, wherein the emotional content tag is further based on predefined demographics of a user of the device.

In Example 8, the subject matter of any one or more of Examples 1-7 optionally include, further comprising a sensor to measure the biometric data.

In Example 9, the subject matter of Example 8 optionally includes, wherein the biometric data includes facial expression data.

In Example 10, the subject matter of any one or more of Examples 8-9 optionally include, wherein the biometric data includes blood pressure data.

In Example 11, the subject matter of any one or more of Examples 8-10 optionally include, wherein the biometric data includes skin conductance data.

Example 12 is a method comprising: receiving, at a device, biometric data and a timestamp; analyzing the biometric data to determine an emotional reaction occurred; tagging a portion of content with an emotional content tag based on the emotional reaction, wherein the portion of content was playing during a time corresponding to the timestamp; and sending the portion of content and the emotional content tag to a server.

In Example 13, the subject matter of Example 12 optionally includes, wherein the device is a wearable device.

In Example 14, the subject matter of any one or more of Examples 12-13 optionally include, wherein the biometric data includes heart rate data.

In Example 15, the subject matter of Example 14 optionally includes, wherein analyzing the biometric data includes analyzing the heart rate data to determine whether the heart rate data matches a positive or a negative profile.

In Example 16, the subject matter of Example 15 optionally includes, wherein the emotional content tag includes a positive emotional content tag when the heart rate data matches the positive profile and includes a negative emotional content tag when the heart rate data matches the negative profile.

In Example 17, the subject matter of any one or more of Examples 12-16 optionally include, wherein tagging the portion of content includes adding a tag to an HTML5 media file.

In Example 18, the subject matter of any one or more of Examples 12-17 optionally include, further comprising creating the portion of content from a content file, the portion of content created based on the timestamp and a detected scene beginning.

In Example 19, the subject matter of any one or more of Examples 12-18 optionally include, wherein the emotional content tag is further based on predefined demographics of a user of the device.

In Example 20, the subject matter of any one or more of Examples 12-19 optionally include, wherein the biometric data includes facial expression data.

In Example 21, the subject matter of any one or more of Examples 12-20 optionally include, wherein the biometric data includes blood pressure data.

In Example 22, the subject matter of any one or more of Examples 12-21 optionally include, wherein the biometric data includes skin conductance data.

Example 23 is at least one machine-readable medium including instructions for operation of a computing system, which when executed by a machine, cause the machine to perform operations of any of the methods of Examples 12-22.

Example 24 is an apparatus comprising means for performing any of the methods of Examples 12-22.

Example 25 is at least one machine-readable medium including instructions for operation of a computing system, which when executed by a machine, cause the machine to perform operations comprising: receiving, at a device, biometric data and a timestamp; analyzing the biometric data to determine an emotional reaction occurred; tagging a portion of content with an emotional content tag based on the emotional reaction, wherein the portion of content was playing during a time corresponding to the timestamp; and sending the portion of content and the emotional content tag to a server.

In Example 26, the subject matter of Example 25 optionally includes, wherein the device is a wearable device.

In Example 27, the subject matter of any one or more of Examples 25-26 optionally include, wherein the biometric data includes heart rate data.

In Example 28, the subject matter of Example 27 optionally includes, wherein analyzing the biometric data includes analyzing the heart rate data to determine whether the heart rate data matches a positive or a negative profile.

In Example 29, the subject matter of Example 28 optionally includes, wherein the emotional content tag includes a positive emotional content tag when the heart rate data matches the positive profile and includes a negative emotional content tag when the heart rate data matches the negative profile.

In Example 30, the subject matter of any one or more of Examples 25-29 optionally include, wherein tagging the portion of content includes adding a tag to an HTML5 media file.

In Example 31, the subject matter of any one or more of Examples 25-30 optionally include, further comprising creating the portion of content from a content file, the portion of content created based on the timestamp and a detected scene beginning.

In Example 32, the subject matter of any one or more of Examples 25-31 optionally include, wherein the emotional content tag is further based on predefined demographics of a user of the device.

In Example 33, the subject matter of any one or more of Examples 25-32 optionally include, wherein the biometric data includes facial expression data.

In Example 34, the subject matter of any one or more of Examples 25-33 optionally include, wherein the biometric data includes blood pressure data.

In Example 35, the subject matter of any one or more of Examples 25-34 optionally include, wherein the biometric data includes skin conductance data.

Example 36 is an apparatus comprising: means for receiving, at a device, biometric data and a timestamp; means for analyzing the biometric data to determine an emotional reaction occurred; means for tagging a portion of content with an emotional content tag based on the emotional reaction, wherein the portion of content was playing during a time corresponding to the timestamp; and means for sending the portion of content and the emotional content tag to a server.

In Example 37, the subject matter of Example 36 optionally includes, wherein the device is a wearable device.

In Example 38, the subject matter of any one or more of Examples 36-37 optionally include, wherein the biometric data includes heart rate data.

In Example 39, the subject matter of Example 38 optionally includes, wherein the means for analyzing the biometric data include means for analyzing the heart rate data to determine whether the heart rate data matches a positive or a negative profile.

In Example 40, the subject matter of Example 39 optionally includes, wherein the emotional content tag includes a positive emotional content tag when the heart rate data matches the positive profile and includes a negative emotional content tag when the heart rate data matches the negative profile.

In Example 41, the subject matter of any one or more of Examples 36-40 optionally include, wherein the means for tagging the portion of content include means for adding a tag to an HTML5 media file.

In Example 42, the subject matter of any one or more of Examples 36-41 optionally include, further comprising means for creating the portion of content from a content file, the portion of content created based on the timestamp and a detected scene beginning.

In Example 43, the subject matter of any one or more of Examples 36-42 optionally include, wherein the emotional content tag is further based on predefined demographics of a user of the device.

In Example 44, the subject matter of any one or more of Examples 36-43 optionally include, wherein the biometric data includes facial expression data.

In Example 45, the subject matter of any one or more of Examples 36-44 optionally include, wherein the biometric data includes blood pressure data.

In Example 46, the subject matter of any one or more of Examples 36-45 optionally include, wherein the biometric data includes skin conductance data.

Example 47 is a method comprising: receiving, at a server, content tagged as emotional content based on biometric data measured by a wearable device; aggregating the tagged content with other received content; generating, using the aggregated content, an emotional content video segment; receiving a request for emotional content; and providing the emotional content video segment in response to receiving the request.

In Example 48, the subject matter of Example 47 optionally includes, wherein receiving the request for emotional content includes receiving a user request for positive emotional content.

In Example 49, the subject matter of any one or more of Examples 47-48 optionally include, wherein the emotional content video segment is an HTML5 video file.

In Example 50, the subject matter of any one or more of Examples 47-49 optionally include, wherein the biometric data includes heart rate data.

In Example 51, the subject matter of any one or more of Examples 47-50 optionally include, wherein aggregating the tagged content includes aggregating the tagged content with other received content based on metadata from the tagged content.

In Example 52, the subject matter of any one or more of Examples 47-51 optionally include, wherein the biometric data includes facial expression data.

In Example 53, the subject matter of any one or more of Examples 47-52 optionally include, wherein the biometric data includes blood pressure data.

In Example 54, the subject matter of any one or more of Examples 47-53 optionally include, wherein the biometric data includes skin conductance data.

Example 55 is at least one machine-readable medium including instructions for operation of a computing system, which when executed by a machine, cause the machine to perform operations comprising: receiving, at a server, content tagged as emotional content based on biometric data measured by a wearable device; aggregating the tagged content with other received content; generating, using the aggregated content, an emotional content video segment; receiving a request for emotional content; and providing the emotional content video segment in response to receiving the request.

In Example 56, the subject matter of Example 55 optionally includes, wherein receiving the request for emotional content includes receiving a user request for positive emotional content.

In Example 57, the subject matter of any one or more of Examples 55-56 optionally include, wherein the emotional content video segment is an HTML5 video file.

In Example 58, the subject matter of any one or more of Examples 55-57 optionally include, wherein the biometric data includes heart rate data.

In Example 59, the subject matter of any one or more of Examples 55-58 optionally include, wherein aggregating the tagged content includes aggregating the tagged content with other received content based on metadata from the tagged content.

In Example 60, the subject matter of any one or more of Examples 55-59 optionally include, wherein the biometric data includes facial expression data.

In Example 61, the subject matter of any one or more of Examples 55-60 optionally include, wherein the biometric data includes blood pressure data.

In Example 62, the subject matter of any one or more of Examples 55-61 optionally include, wherein the biometric data includes skin conductance data.

Example 63 is an apparatus comprising: means for receiving, at a server, content tagged as emotional content based on biometric data measured by a wearable device; means for aggregating the tagged content with other received content; means for generating, using the aggregated content, an emotional content video segment; means for receiving a request for emotional content; and means for providing the emotional content video segment in response to receiving the request.

In Example 64, the subject matter of Example 63 optionally includes, wherein the means for receiving the request for emotional content include means for receiving a user request for positive emotional content.

In Example 65, the subject matter of any one or more of Examples 63-64 optionally include, wherein the emotional content video segment is an HTML5 video file.

In Example 66, the subject matter of any one or more of Examples 63-65 optionally include, wherein the biometric data includes heart rate data.

In Example 67, the subject matter of any one or more of Examples 63-66 optionally include, wherein the means for aggregating the tagged content include means for aggregating the tagged content with other received content based on metadata from the tagged content.

In Example 68, the subject matter of any one or more of Examples 63-67 optionally include, wherein the biometric data includes facial expression data.

In Example 69, the subject matter of any one or more of Examples 63-68 optionally include, wherein the biometric data includes blood pressure data.

In Example 70, the subject matter of any one or more of Examples 63-69 optionally include, wherein the biometric data includes skin conductance data.

Example 71 is a device comprising: processing circuitry to: receive content tagged as emotional content based on biometric data measured by a wearable device; aggregate the tagged content with other received content; generate, using the aggregated content, an emotional content video segment; receive a request for emotional content; and provide the emotional content video segment in response to receiving the request.

In Example 72, the subject matter of Example 71 optionally includes, wherein to receive the request for emotional content the processing circuitry is to receive a user request for positive emotional content.

In Example 73, the subject matter of any one or more of Examples 71-72 optionally include, wherein the emotional content video segment is an HTML5 video file.

In Example 74, the subject matter of any one or more of Examples 71-73 optionally include, wherein the biometric data includes heart rate data.

In Example 75, the subject matter of any one or more of Examples 71-74 optionally include, wherein to aggregate the tagged content, the processing circuitry is to aggregate the tagged content with other received content based on metadata from the tagged content.

In Example 76, the subject matter of any one or more of Examples 71-75 optionally include, wherein the biometric data includes facial expression data.

In Example 77, the subject matter of any one or more of Examples 71-76 optionally include, wherein the biometric data includes blood pressure data.

In Example 78, the subject matter of any one or more of Examples 71-77 optionally include, wherein the biometric data includes skin conductance data.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:
1. A wearable device comprising:
processing circuitry to:
receive biometric data, including heart rate data, a first timestamp, and a second timestamp;
analyze the biometric data to determine that a first emotional reaction occurred and a second emotional reaction occurred and to determine whether a first set of the heart rate data corresponding to the first emotional reaction matches a positive or a negative emotional profile and whether a second set of the heart rate data corresponding to the second emotional reaction matches a positive or negative emotional profile, wherein the first and second emotional reactions correspond to opposite emotional profiles;
tag a first portion of content with a first emotional content tag based on the first emotional reaction, wherein the first portion of content was playing during a time corresponding to the first timestamp;
tag a second portion of content with a second emotional content tag based on the second emotional reaction, wherein the second portion of content was playing during a time corresponding to the second timestamp; and send the first portion of content with the first emotional content tag and the second portion of content with the second emotional content tag to a server in a single media file.

2. The wearable device of claim 1, wherein the first emotional content tag includes a positive emotional content tag when the first set of the heart rate data matches the positive profile and includes a negative emotional content tag when the first set of the heart rate data matches the negative profile.

3. The wearable device of claim 1, wherein to tag the first portion of content the processing circuitry is to add a tag to an HTML5 media file.

4. The wearable device of claim 1, wherein the processing circuitry is to create the first portion of content from a content file, the first portion of content created based on the first timestamp and a detected scene beginning.

5. The wearable device of claim 1, wherein the first emotional content tag is further based on predefined demographics of a user of the device.

6. The wearable device of claim 1, further comprising a sensor to measure the biometric data.

7. The wearable device of claim 6, wherein the biometric data includes facial expression data.

8. The wearable device of claim 6, wherein the biometric data includes blood pressure data.

9. The wearable device of claim 8, wherein to analyze the biometric data the blood pressure data is analyzed to further distinguish an emotional response type.

10. The wearable device of claim 6, wherein the biometric data includes skin conductance data.

11. The wearable device of claim 10, wherein to analyze the biometric data the skin conductance data is analyzed to further distinguish an emotional response type.

12. A method comprising:
    receiving, at a device, biometric data, including heart rate data, a first timestamp, and a second timestamp;
    analyzing the biometric data to determine that a first emotional reaction occurred and a second emotional reaction occurred and to determine whether a first set of the heart rate data corresponding to the first emotional reaction matches a positive or a negative emotional profile and whether a second set of the heart rate data corresponding to the second emotional reaction matches a positive or negative emotional profile, wherein the first and second emotional reactions correspond to opposite emotional profiles;
    tagging a first portion of content with a first emotional content tag based on the first emotional reaction, wherein the first portion of content was playing during a time corresponding to the first timestamp;
    tagging a second portion of content with a second emotional content tag based on the second emotional reaction, wherein the second portion of content was playing during a time corresponding to the second timestamp; and
    sending the first portion of content with the first emotional content tag and the second portion of content with the second emotional content tag to a server in a single media file.

13. The method of claim 12, wherein the device is a wearable device.

14. The method of claim 12, wherein the first emotional content tag includes a positive emotional content tag when the first set of heart rate data matches the positive profile and includes a negative emotional content tag when the first set of heart rate data matches the negative profile.

15. The method of claim 12, wherein tagging the first portion of content includes adding a tag to an HTML5 media file.

16. The method of claim 12, further comprising creating the first portion of content from a content file, the first portion of content created based on the first timestamp and a detected scene beginning.

17. The method of claim 12, wherein the first emotional content tag is further based on predefined demographics of a user of the device.

18. The method of claim 12, wherein the biometric data includes blood pressure data.

19. The method of claim 18, wherein analyzing the biometric data includes analyzing the blood pressure data to further distinguish an emotional response type.

20. At least one non-transitory machine-readable medium including instructions for operation of a computing system, which when executed by a machine, cause the machine to perform operations comprising:
    receiving, at a device, biometric data, including heart rate data, a first timestamp, and a second timestamp;
    analyzing the biometric data to determine that a first emotional reaction occurred and a second emotional reaction occurred and to determine whether a first set of the heart rate data corresponding to the first emotional reaction matches a positive or a negative emotional profile and whether a second set of the heart rate data corresponding to the second emotional reaction matches a positive or negative emotional profile, wherein the first and second emotional reactions correspond to opposite emotional profiles;
    tagging a first portion of content with a first emotional content tag based on the first emotional reaction, wherein the first portion of content was playing during a time corresponding to the first timestamp;
    tagging a second portion of content with a second emotional content tag based on the second emotional reaction, wherein the second portion of content was playing during a time corresponding to the second timestamp; and
    sending the first portion of content with the first emotional content tag and the second portion of content with the second emotional content tag to a server in a single media file.

21. The at least one machine-readable medium of claim 20, wherein the device is a wearable device.

22. The at least one machine-readable medium of claim 20, wherein the first emotional content tag includes a positive emotional content tag when the first set of heart rate data matches the positive profile and includes a negative emotional content tag when the first set of heart rate data matches the negative profile.

23. The at least one machine-readable medium of claim 20, wherein tagging the first portion of content includes adding a tag to an HTML5 media file.

24. The at least one machine-readable medium of claim 20, wherein the biometric data includes blood pressure data.

25. The at least one machine-readable medium of claim 24, wherein analyzing the biometric data includes analyzing the blood pressure data to further distinguish an emotional response type.

* * * * *